United States Patent
Coiro, Sr. et al.

(10) Patent No.: US 8,161,910 B2
(45) Date of Patent: Apr. 24, 2012

(54) INTEGRATED RFID TAG IN A CARD HOLDER, CAGE, LID, AND RACK FOR USE WITH INVENTORYING AND TRACKING OF CAGE OCCUPANTS AND EQUIPMENT

(75) Inventors: Michael A. Coiro, Sr., Jacobstown, NJ (US); Steven J. Miller, Allentown, NJ (US); Tom Schupsky, Cream Ridge, NJ (US)

(73) Assignee: Allentown Caging & Equipment Co., Inc., Allentown, NJ (US)

( * ) Notice: Subject to any disclaimer, the term of this patent is extended or adjusted under 35 U.S.C. 154(b) by 165 days.

(21) Appl. No.: 12/473,686

(22) Filed: May 28, 2009

(65) Prior Publication Data

US 2009/0293815 A1  Dec. 3, 2009

Related U.S. Application Data

(60) Provisional application No. 61/056,901, filed on May 29, 2008.

(51) Int. Cl.
*A01K 29/00* (2006.01)
(52) U.S. Cl. .................................... 119/417; 40/124.06
(58) Field of Classification Search ............. 40/124.06; 119/417, 452
See application file for complete search history.

(56) References Cited

U.S. PATENT DOCUMENTS

| | | | |
|---|---|---|---|
| 3,830,200 A * | 8/1974 | Patterson | 119/419 |
| 5,986,562 A | 11/1999 | Nikolich | |
| 6,254,006 B1 | 7/2001 | Mish | |
| 6,600,418 B2 | 7/2003 | Francis et al. | |
| 6,998,980 B2 * | 2/2006 | Ingley et al. | 340/539.26 |
| 7,126,471 B2 | 10/2006 | Ahmed et al. | |
| 7,277,014 B1 | 10/2007 | Waterhouse et al. | |
| 7,500,604 B2 * | 3/2009 | Holme | 235/380 |
| 7,774,969 B1 * | 8/2010 | Silverman | 40/661 |
| 2005/0241591 A1 | 11/2005 | Ingley, III et al. | |
| 2006/0272189 A1 * | 12/2006 | Cummings et al. | 40/607.11 |
| 2009/0031603 A1 * | 2/2009 | Kitchen et al. | 40/665 |
| 2010/0079284 A1 * | 4/2010 | Perez et al. | 340/568.1 |
| 2011/0079971 A1 * | 4/2011 | Lulevitch | 280/28.12 |

* cited by examiner

*Primary Examiner* — Yvonne Abbott
(74) *Attorney, Agent, or Firm* — Porzio, Bromberg & Newman, P.C.

(57) ABSTRACT

The present invention relates to an integrated RFID card holder, cage, lid or rack and system for collecting census, inventorying, and tracking of animal cages, lids, card holders, racks, and other related equipment. Preferably, the card holder is comprised of an RF transparent material such as plastic. During operation, a RFID reader reads each integrated RFID card holder attached to an animal cage for virtually linking the cage to an animal rack in effect assigning a parking spot to each animal cage within an animal cage rack system. The integrated RFID card holder can be determined to be in a room when the Received Signal Strength Indicator (RSSI) is the highest comparing multiple reads from one or many antennas.

10 Claims, 11 Drawing Sheets

INTEGRATED RFID TAG IN A CARD HOLDER, CAGE, LID, AND RACK FOR USE WITH INVENTORYING AND TRACKING OF CAGE OCCUPANTS AND EQUIPMENT

CROSS REFERENCE TO RELATED APPLICATION

This application claims the benefit of U.S. Provisional Patent Application No. 61/056,901, filed May 29, 2008, the entirety of which is hereby incorporated by reference into this application.

BACKGROUND OF THE INVENTION

Conventionally, cards identifying research animals have been attached to animal cages in a rack system. A card holder is attached to the animal cage system. The card slides into the card holder. Typically, the card holder is comprised of metal.

Dyanasys has developed a product referred to as Dyanasys Animal Care Warehouse Management System which attaches a radio frequency identification (RFID) transmitter to a conventional metal card holder. The card can be read up to a range of about 8 to 10 feet.

U.S. Patent Application Publication No. 2005/0241591 describes an animal cage in which a rear wall has an opening for inserting a monitoring module. The monitoring monitor monitors various conditions of the cage. A radio frequency identification (RFID) tag can be integrated with the monitoring linkage. The RFID tag can be programmed with identification information, such as number of the cage, type of animal, number of animals and type of testing. The tag can be read with a reader to keep track and identify each cage. This patent has the drawback of not including the combination of a card holder and RFID tag with an animal cage. It is desirable to provide an improved integrated RFID card holder and a system operable at a greater range for RFID inventorying and/or tracking of animals, animal cages, and racks

SUMMARY OF THE INVENTION

The present invention relates to an integrated RFID card holder and system for inventorying and/or tracking animal cages. Preferably, the integrated RFID card holder is manufactured of an RF transparent material, such as a non-metallic material. In one embodiment, a RFID inlay is received in a cavity of the card holder for unencumbering the RFID inlay and allowing a greater range of transmission of the passive RFID signal up to about 25 feet. The cavity can be environmentally sealed to enable repeatable autoclaving, chemical decontamination, such as with vaporized hydrogen peroxide gas, chlorine dioxide gas or wet chemical wipe down, and repeatable washing cycles. Alternatively, the RFID inlay can be integrated into an animal cage or lid of the animal cage or rack of animal cages which are comprised or a portion is comprised of a RF transparent material. In one embodiment, during operation, a RFID reader reads each integrated RFID card holder attached to an animal cage for virtually linking the cage to a database including information of the animal rack, in effect assigning a parking spot to each animal cage within an animal cage rack system. The integrated RFID card holder or RFID inlay integrated into the animal cage or lid of the animal cage or rack of animal cages can be determined to be in a room or a position in a room where the Received Signal Strength Indicator (RSSI) is the highest by comparing multiple reads from one or many antennas for providing data collection. The pin-pointing of a location of the integrated RFID card holder, cage, lid or rack within a facility can be used for census, inventory, and tracking purposes.

The invention will be more fully described by reference to the following drawings.

DETAILED DESCRIPTION

Figure 1:
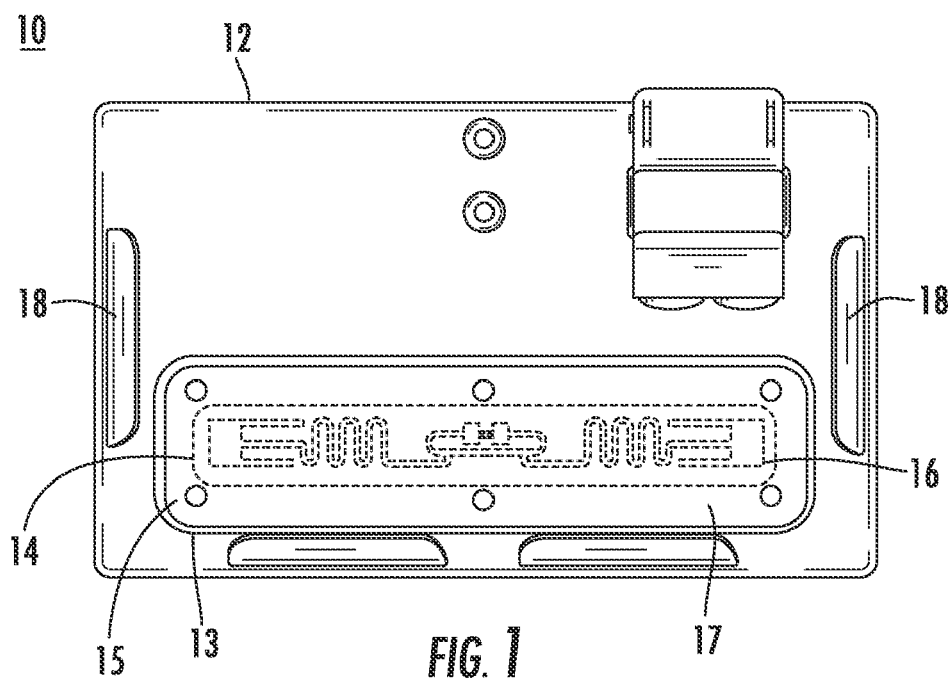
FIG. 1 is a rear elevational view of an integrated RFID card holder in accordance with the teaching of the present invention.
Figure 2:
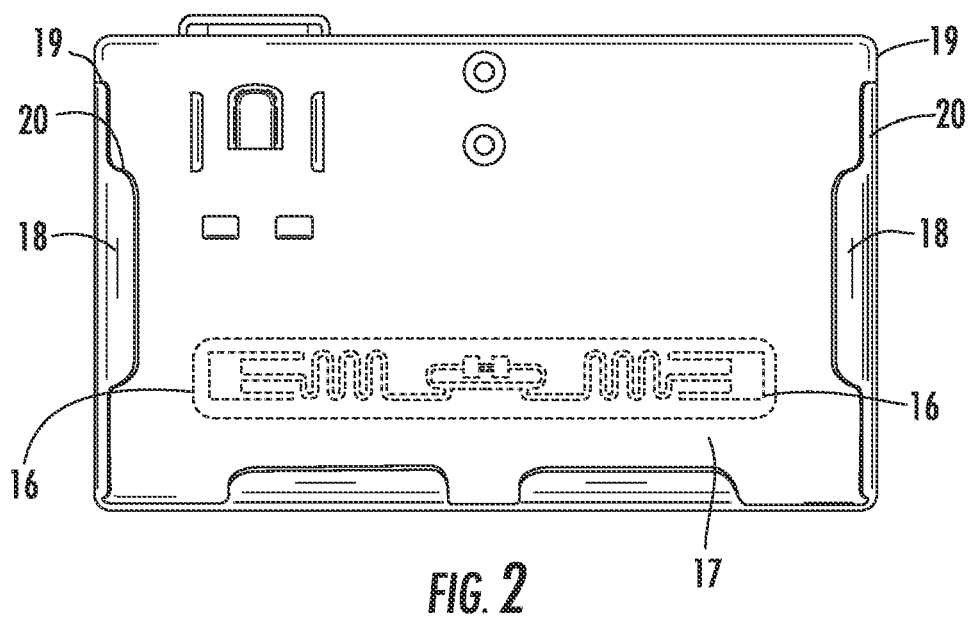
FIG. 2 is a front elevational view of the integrated RFID card holder.

Reference will now be made in greater detail to a preferred embodiment of the invention, an example of which is illustrated in the accompanying drawings. Wherever possible, the same reference numerals will be used throughout the drawings and the description to refer to the same or like parts.

FIGS. 1-4 illustrate an integrated RFID card holder 10 in accordance with the teachings of the present invention. Card holder 12 includes cavity 13 for receiving RFID inlay 14. Cavity 13 has a shape substantially matching the shape of RFID inlay 14. In one embodiment, RFID inlay 14 can comprise RFID support 15 having the shape substantially matching the shape of cavity 13 and RFID tag 16. For example, RFID tag 16 can be applied as a RFID label or with an adhesive to RFID support 15. Alternatively, RFID tag 16 can be integrated with RFID support 15. Cover 17 can be assembled into place over cavity 13 for retaining RFID inlay 14 within cavity 13. For example cover 17 can be environmentally sealed to cavity 13 by using one or more of the following, sonic welding of similar materials, snap fit of cover 17 and cavity 13 and use of weather seal gasket 11, insert molding of RFID inlay 14 and an adhesive applied between cavity 13 and RFID inlay 14. Preferably, card holder 12 is comprised of a RF transparent material such a non-metallic material. For example, RF transparent material can be rigid plastic or ceramic.

Figure 5:
FIG. 5 is a schematic diagram of an animal information card.
Figure 6:
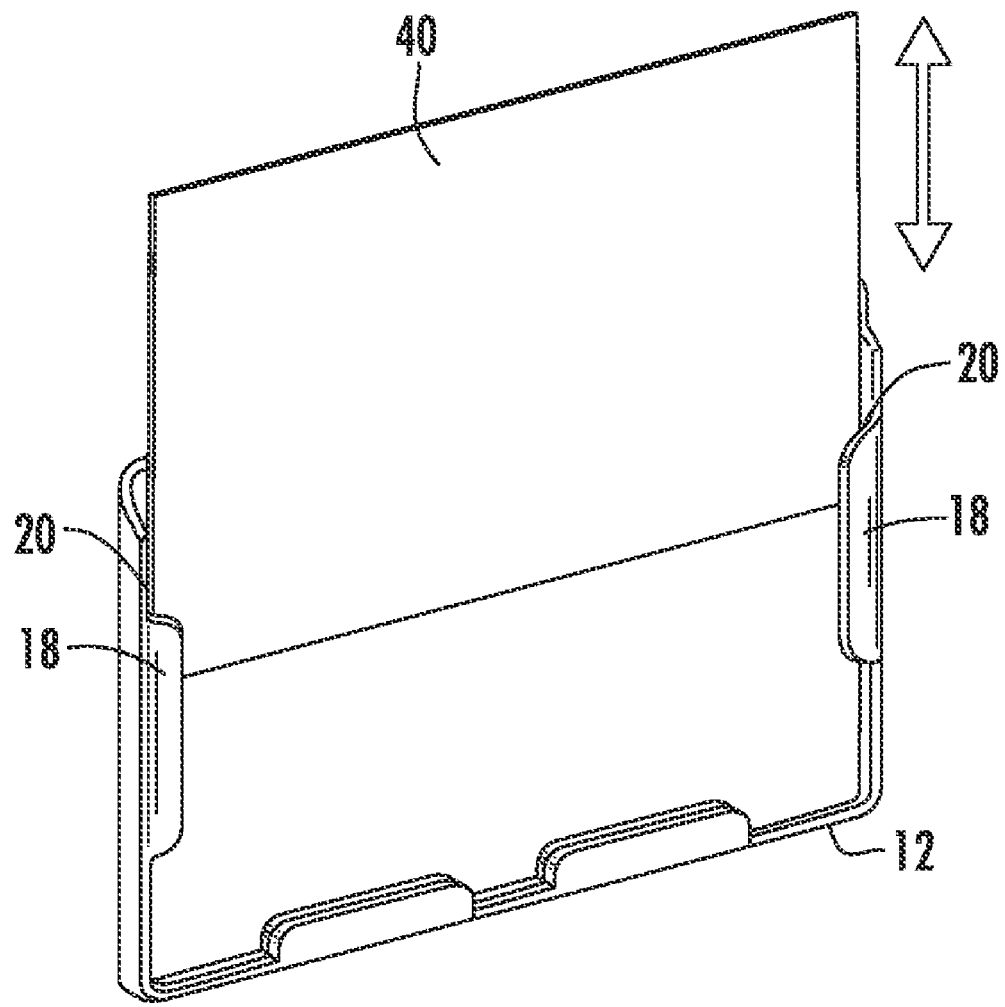
FIG. 6 is a schematic diagram of the animal information card being inserted in the integrated RFID card holder

A plurality of protrusions 18 are positioned at edges 19 of card holder 12. Slot 20 is positioned within each protrusion 18. Animal cage information card 40 can slide within slot 20 and be retained by protrusions 18, as shown in FIGS. 5 and 6. For example, the card can be a 3×4 or 3×5 card.

Figure 3:
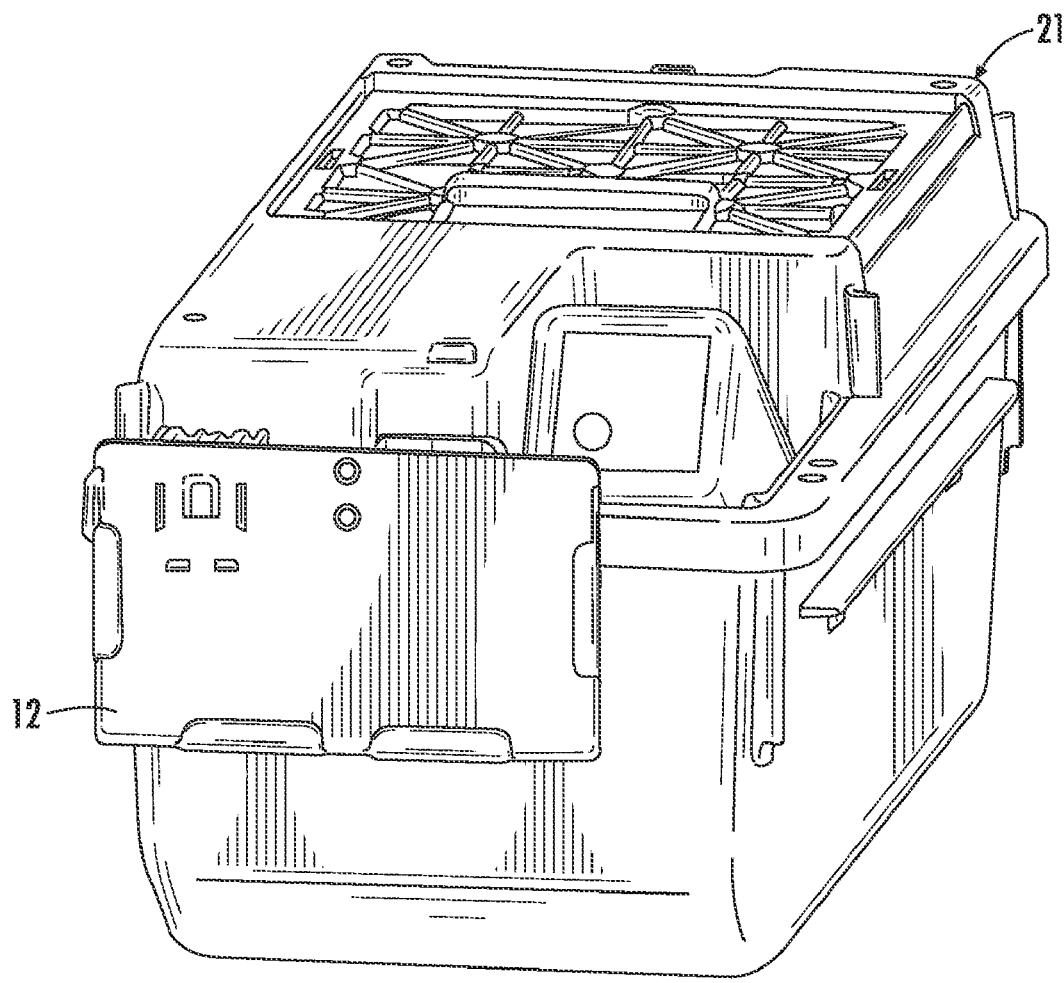
FIG. 3 is a front and side elevational view of the integrated RFID card holder attached to the animal cage.
Figure 4:
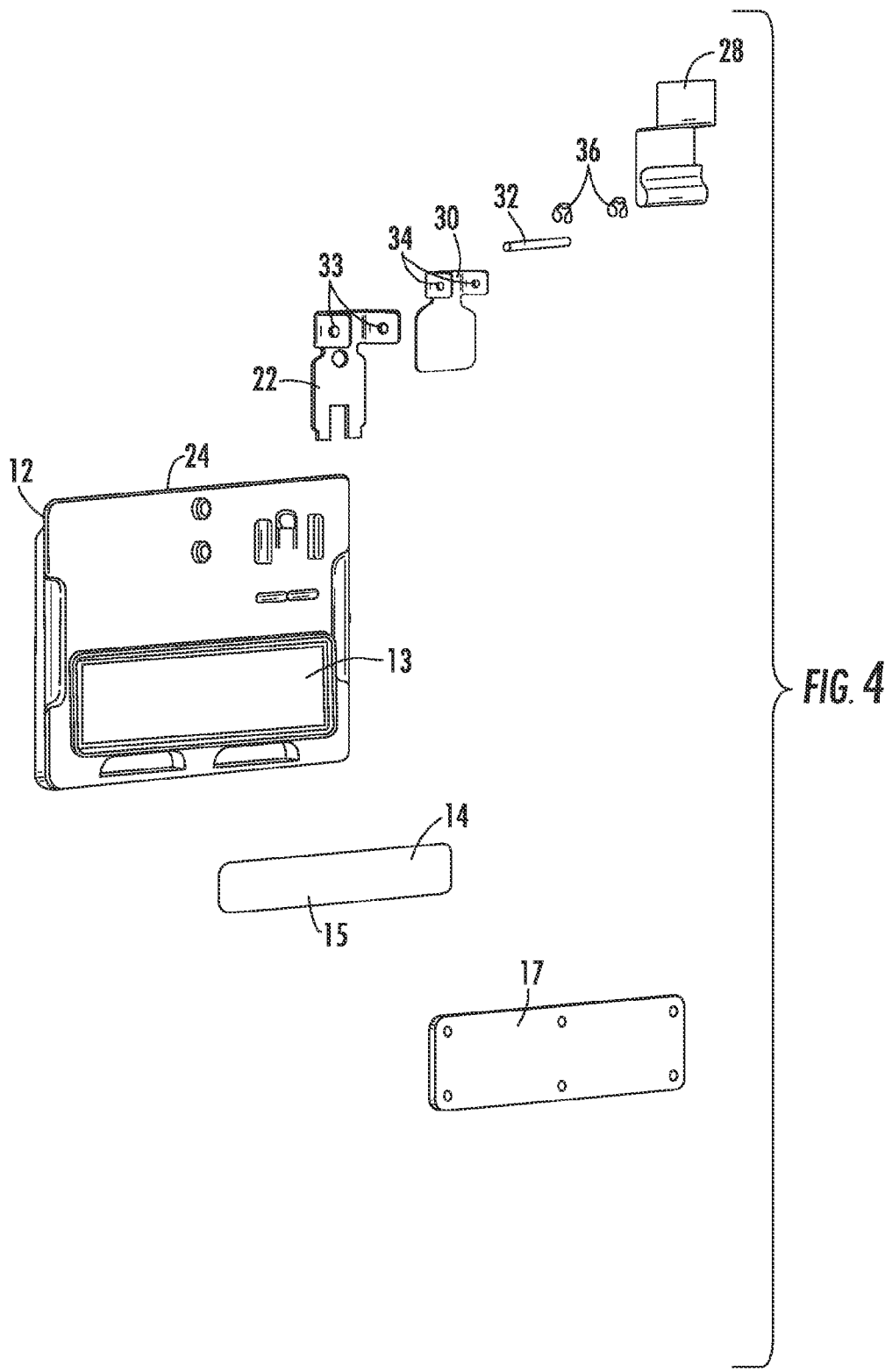
FIG. 4 is a schematic diagram of assembly of the integrated RFID card holder.

As shown in FIG. 3, integrated RFID card holder 10 is attached to animal cage 21 and moves with animal cage 21 independent of placement of animal cage 21 on a rack for animal cages. In this embodiment, integrated RFID card holder 10 is used in a vertical position. Clip holder 22 attaches to rear surface 24 of card holder 12 for removably or permanently attaching integrated RFID card holder 10 to animal cage 21, as shown in FIGS. 3 and 4. Clip 28 is attached to clip holder 22. For example, clip 28 can be attached using mounting bracket 30. Mounting bracket 30 is attached to clip holder 22 using rod 32 received within apertures 33 of clip holder 22 and apertures 34 of mounting bracket 30. E-ring 36 retains rod 32. Clip 28 can be attached to animal cage 21.

Animal cage information card 40 includes indicia region 42, as shown in FIG. 5. Indicia region 42 includes information directed to the animal. For example, the information can include investigator, protocol, contact, vendor, vendor breeding area, number of animals, species, strain, age, date of birth, sex and room assignment. Bar code 44 is associated with card 40. Bar code 44 provides a unique identification number.

Figure 7:
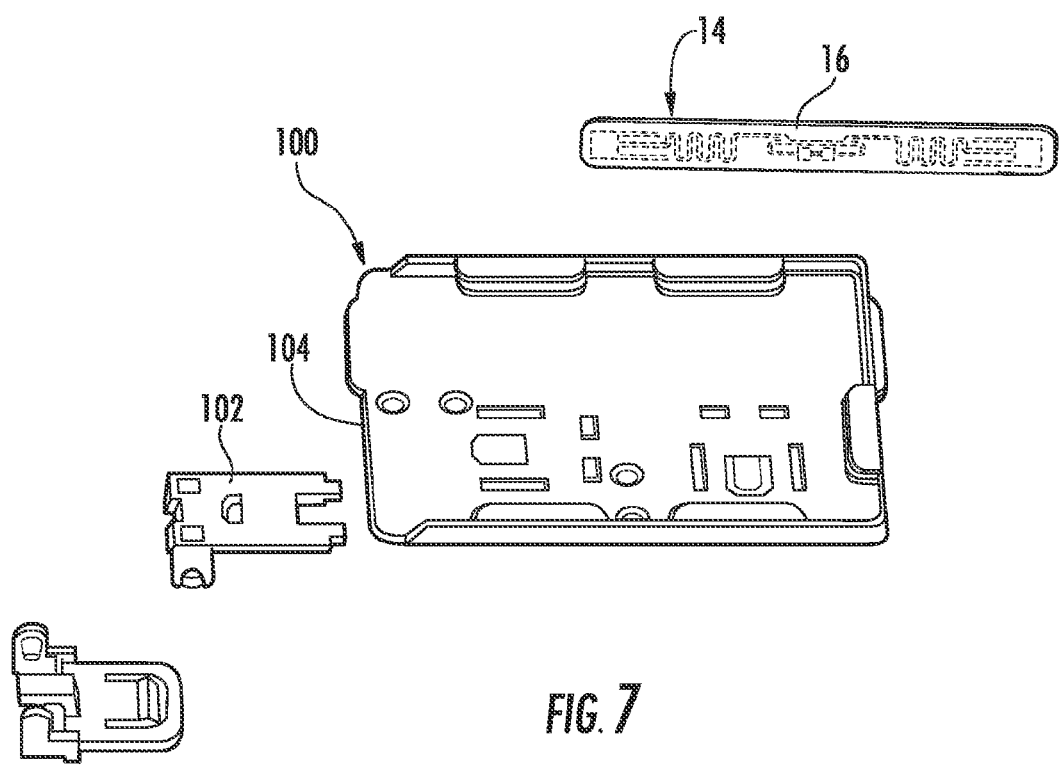
FIG. 7 is a schematic diagram of an alternate embodiment of an assembly of the integrated RFID inlay assembled directly to a RF transparent card holder.

In an alternate embodiment, RFID inlay 14 comprises RFID tag 16 which is attached directly on a RF transparent, integrated RFID card holder 100 without using cavity 13, as shown in FIG. 7. For example, RFID tag 16 can be applied as a RFID label with an adhesive or insert molded to integrated RFID card holder 100. In this embodiment, integrated card holder 100 can be used in a horizontal or vertical position. Clip holder 102 attaches to rear surface 104 of integrated RFID card holder 100 for removably or permanently attaching integrated RFID card holder 100 to animal cage. Clip 108 is attached to clip holder 102. Clip 108 is attached to animal cage 21 (not shown).

Figure 8:
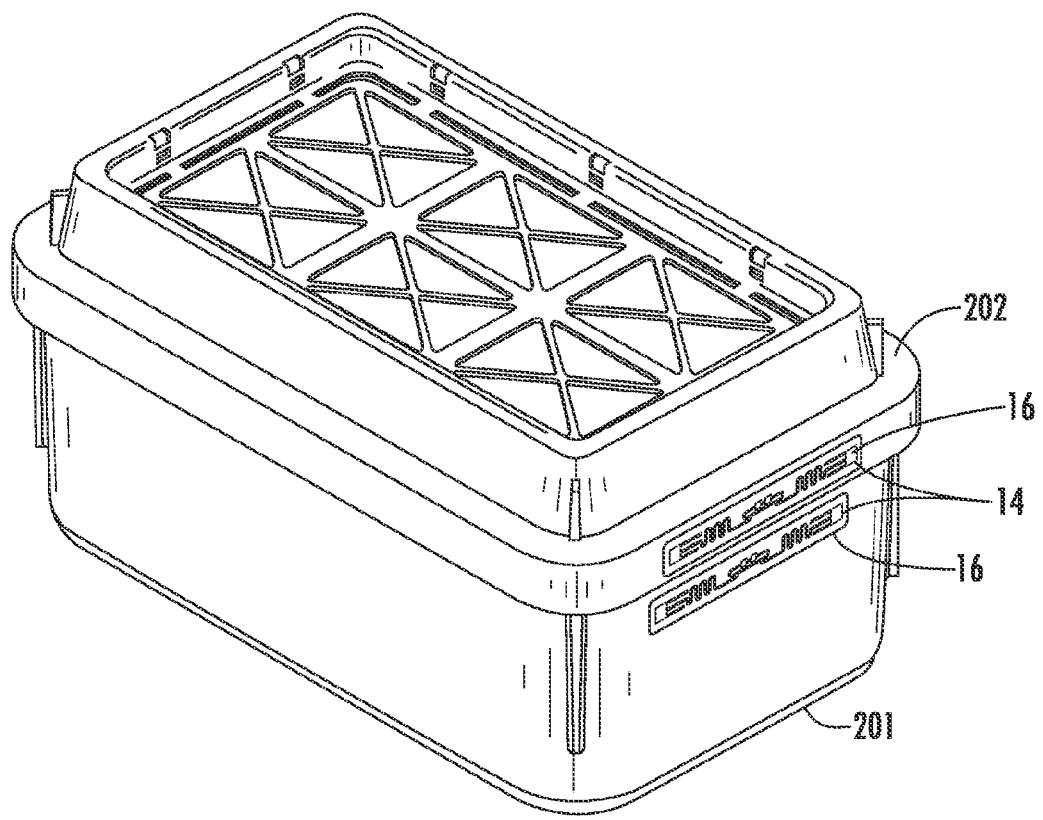
FIG. 8 is an alternate embodiment of an integrated RFID inlay or RFID integrated circuit (IC) in an animal cage or lid of the animal cage.

In an alternate embodiment, RFID inlay 14 can be attached or integrated into animal cage 21 or lid 202 as shown in FIG. 8. For example, RFID tag 16 can be applied as a RFID label or with an adhesive to animal cage 201 or lid 202. Alternatively, RFID tag 16 can be insert molded.

Figure 9:
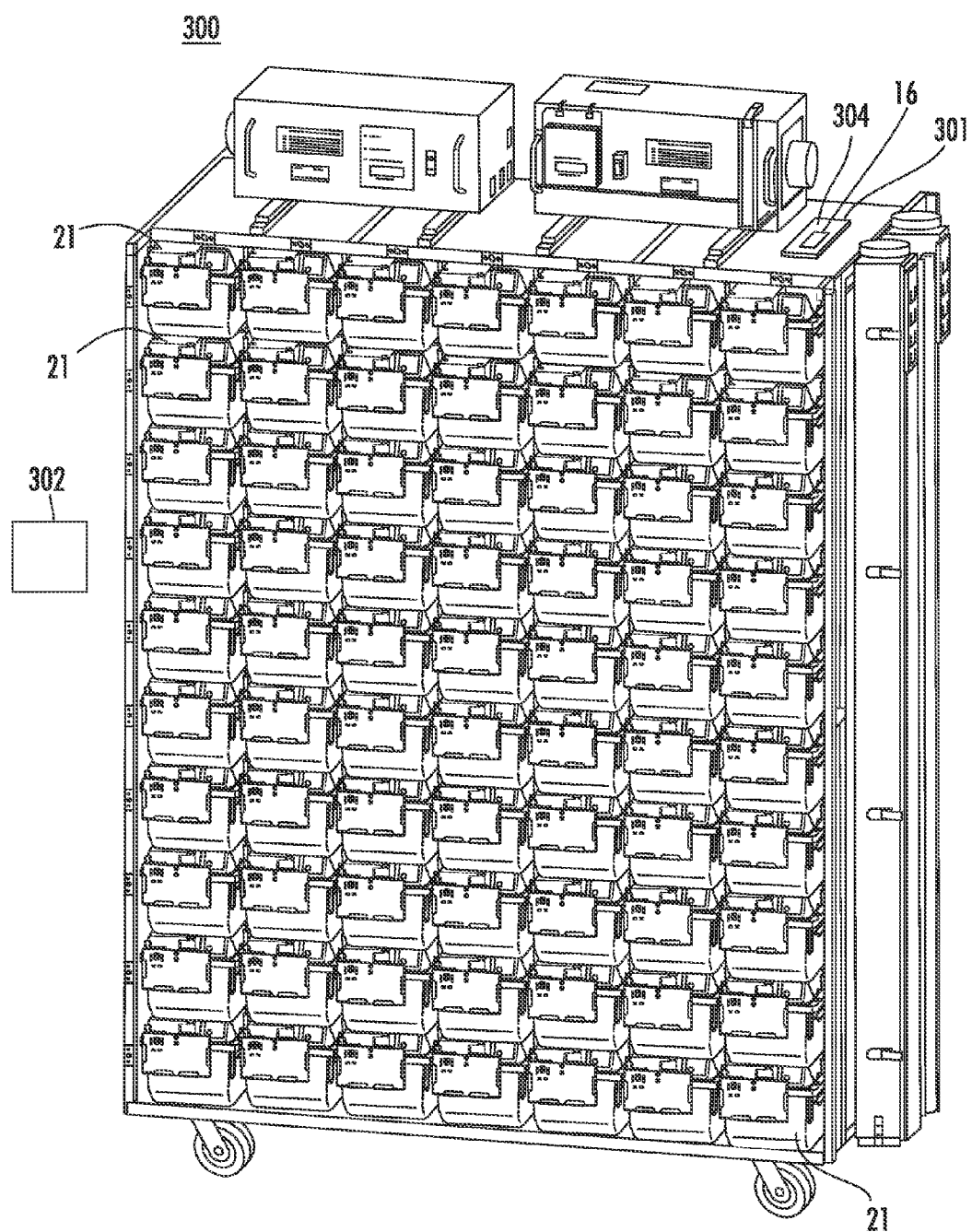
FIG. 9 is a schematic diagram of a rack system for inventorying or tracking animal cages.

Animal cages 21 including RFID inlay 14 in any of the embodiments of integrated RFID card holder 10, integrated RFID card holder 100, attached to animal cage 21 or lid 202 can be used in a rack system for inventorying or tracking animal cages 300, as shown in FIG. 9. RFID reader 302 reads an identification of RFID inlay 14 or each RFID inlay 14 positioned within rack housing animal cages 301. For example, RFID reader 302 can read RFID inlay 14 at a distance up to 20 feet to 25 feet. RFID inlay 305 can also be associated with rack housing animal cages 301. RFID inlay 304 can include RFID tag 16. Alternatively, RFID inlay 304 can include an active RFID tag. In one embodiment, RFID inlay 304 provides a housing for RFID tag 16.

Figure 10:
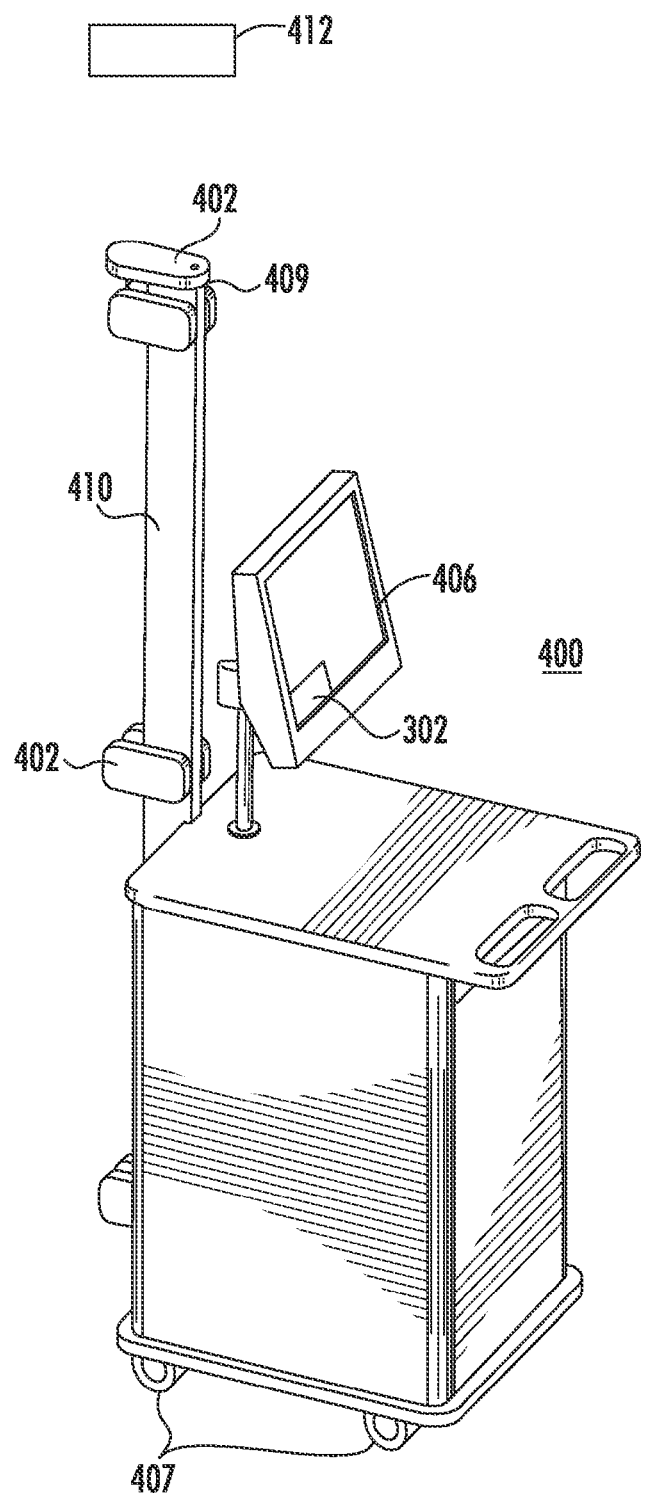
FIG. 10 is a schematic diagram of an inventory cart including a RFID reader.

RFID reader 302 can be associated with inventory cart 400, as shown in FIG. 10. Inventory cart 400 includes antennas 402 associated with RFID reader 302. Inventory cart 400 can also include computer device 406. Inventory cart 400 moves adjacent to the rack housing animal cages (not shown). Inventory cart 400 includes wheels 407 for allowing inventory cart 400 to be rolled adjacent the rack housing animal cages. During operation, RFID reader 302 logs an identification from the RFID tag associated with each cage having an associated integrated RFID card holder 10, integrated RFID card holder 100, attached to animal cage 21 or lid 202 in order to interact with a database stored in computer device 406 and effectively virtually assign a parking spot to each particular animal cage in an animal cage rack system. The data from integrated RFID card holder 10, integrated RFID card holder 100, attached to animal cage 21 or lid 202 can be stored in the data base or memory of computer device 406 and can be used for pinpointing the location of associated RFID card holder 10, integrated RFID card holder 100, attached to animal cage 21 or lid 202 within a facility for census, inventory and tracking purposes. In one embodiment, Received Signal Strength Indicator (RSSI) at RFID antenna/reader 402 mounted at top 409 of inventory mast 410 can be used to determine location, such as within a room or a particular room, which contains integrated RFID card holder 10, integrated RFID card holder 100, attached to animal cage 21 or lid 202 attached to an animal cage. Integrated RFID card holder 10, integrated RFID card holder 100, attached to animal cage 21 or lid 202 is determined to be in a position of a room or room where the RSSI is the highest based on one or more RFID location tags 412 located within the room, such on the ceiling of the room.

Figure 11:
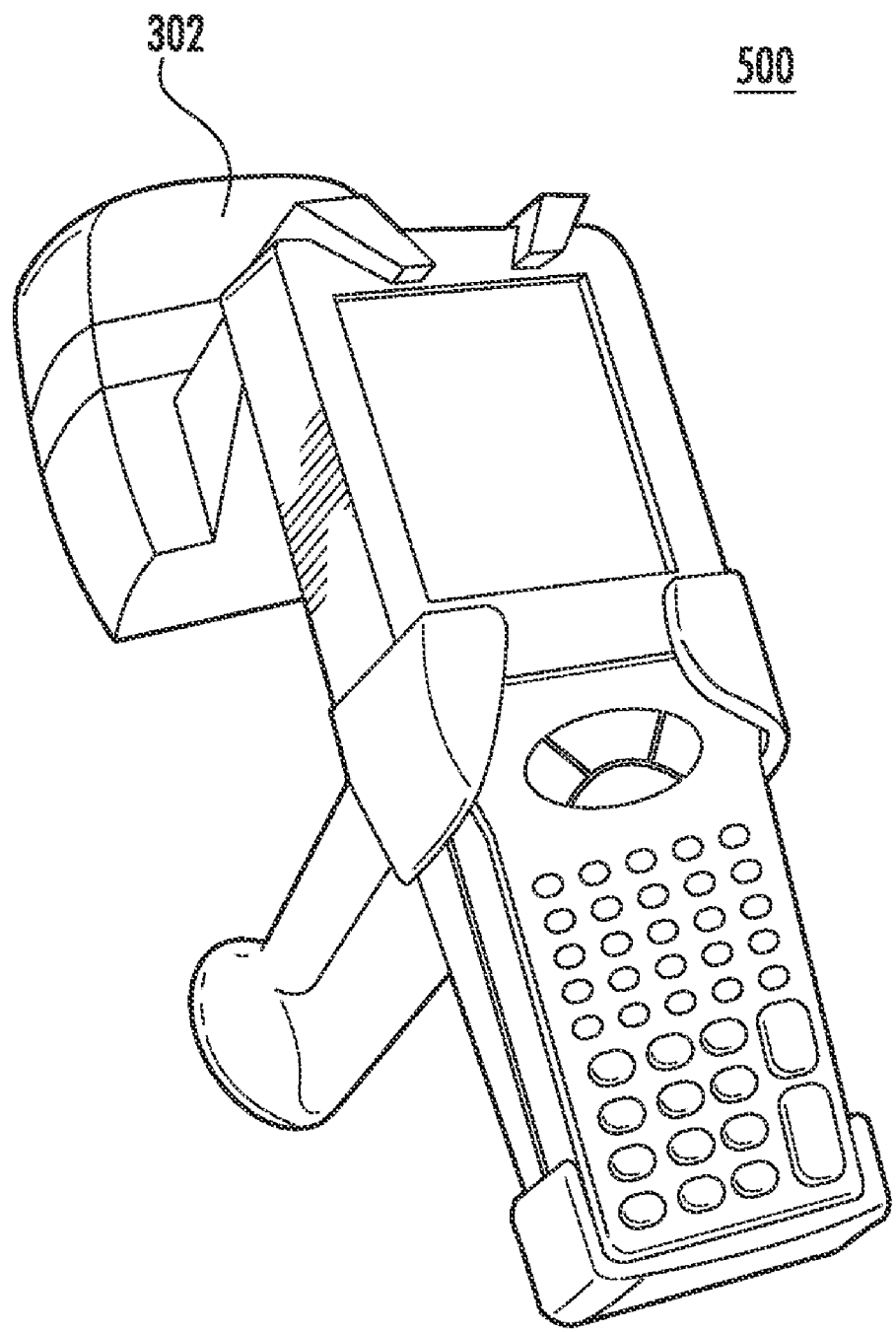
FIG. 11 is a schematic diagram of a handheld RFID reader.

In an alternate embodiment, RFID reader 302 is included in handheld device 500, as shown in FIG. 11. Hand held device 500 can be waved in front of the rack housing animal cages (not shown).

Figure 12:
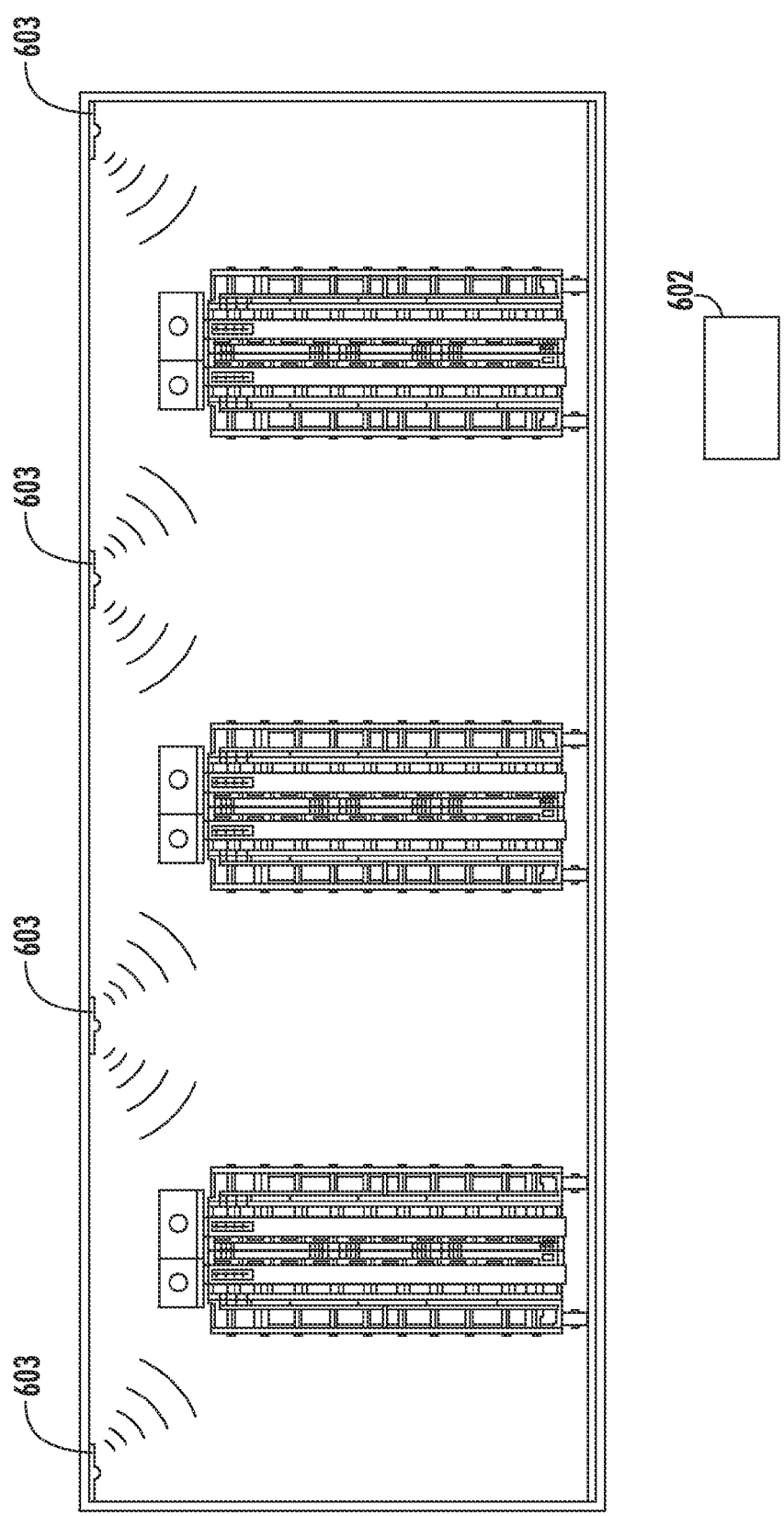
FIG. 12 is a schematic diagram of an embodiment of a plurality of fixed positioned antennas associated within a room.

Alternatively, one or more RFID readers 602 can be associated with a room containing one or more racks housing animal cages 301, as shown in FIG. 12. In this embodiment, RFID reader 602 can be a LAN based RFID reader with fixed positioned antennas 603. In one embodiment, Received Signal Strength Indicator (RSSI) at RFID reader 602 from positioned antennas 603 can be used to determine location, such as within a room or a particular room which contains integrated RFID card holder 10, integrated RFID card holder 100, attached to animal cage 21 or lid 202 attached to an animal cage. Integrated RFID card holder 10, integrated RFID card holder 100, attached to animal cage 21 or lid 202 is determined to be in a position of a room or room where the RSSI is the highest.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. An integrated RFID card holder for an animal cage comprising:
   a card holder, and
   a RFID inlay attached or integrated with said card holder;
   a cover received over said RFID inlay, said cover being environmentally coupled to said card holder;
   said card holder including a slot adapted for receiving a card,
   wherein said card holder is comprised of a RF transparent material.

2. The integrated RFID card holder of claim 1 wherein;
   said card holder including a cavity;
   said RFID inlay being received in said cavity of said card holder;
   said cover being coupled to said cavity for retaining said RFID inlay within said cavity, thereby attaching said RFID inlay to said card holder.

3. The integrated RFID card holder of claim 2 wherein said cover is environmentally coupled to said cavity of said card holder by sonic welding.

4. The integrated RFID card holder of claim 2 wherein said cover is environmentally coupled to said cavity of said card holder by snap fitting said cover into said cavity.

5. The integrated RFID card holder of claim 2 wherein said cover is environmentally coupled to said cavity of said card holder by insert molding said cover into said cavity.

6. The integrated RFID card holder of claim 1 wherein said RF transparent material is a non-metallic material.

7. The integrated RFID card holder of claim 1 wherein said RF transparent material is a plastic or ceramic material.

8. The integrated RFID card holder of claim 1 further comprising clip means for coupling said card holder to said animal cage.

9. The integrated RFID card holder of claim 1 wherein said RFID inlay comprises a tag, said tag being applied to said card holder as a RFID label or with an adhesive.

10. The integrated RFID card holder of claim 1 further comprising a card received in said slot of said card holder wherein said card includes an indicia region adapted for receiving information directed to an animal within the animal cage and/or a bar code.

* * * * *